United States Patent
Logue et al.

(10) Patent No.: US 8,694,590 B2
(45) Date of Patent: Apr. 8, 2014

(54) METHOD AND SYSTEM FOR FORMATTING MESSAGES INTO STYLIZED MESSAGES FOR PRINT OUT

(75) Inventors: Jay D. Logue, San Jose, CA (US); Joseph M. Beninato, Mountain View, CA (US); Julia D. Schiff, Los Gatos, CA (US); Jennifer Bush, San Jose, CA (US); Jin Yaw Sun, San Jose, CA (US); Sharon E. Chiarella, Redwood City, CA (US); Yair Zadik, Palo Alto, CA (US); Michael R. Migliore, Palo Alto, CA (US); Barclay R. Loftus, Mountain View, CA (US); Marian B. Cauwet, Cupertino, CA (US); Joseph Posner, San Francisco, CA (US)

(73) Assignee: Presto Services, Inc., Mountain View, CA (US)

( * ) Notice: Subject to any disclaimer, the term of this patent is extended or adjusted under 35 U.S.C. 154(b) by 0 days.

(21) Appl. No.: 11/749,570

(22) Filed: May 16, 2007

(65) Prior Publication Data
US 2007/0271347 A1    Nov. 22, 2007

Related U.S. Application Data

(60) Provisional application No. 60/747,919, filed on May 22, 2006.

(51) Int. Cl.
*G06F 15/16* (2006.01)
*G06F 17/00* (2006.01)
*H04L 12/28* (2006.01)
*H04L 12/56* (2011.01)

(52) U.S. Cl.
USPC ............ 709/206; 709/203; 715/234; 370/389

(58) Field of Classification Search
USPC .................................................. 709/204–207
See application file for complete search history.

(56) References Cited

U.S. PATENT DOCUMENTS

| | | | |
|---|---|---|---|
| 5,331,431 A | 7/1994 | Jasinski | |
| 5,375,229 A | 12/1994 | Liccese et al. | |
| 5,461,488 A | 10/1995 | Witek | |
| 5,548,814 A | 8/1996 | Lorang et al. | |
| 5,902,353 A | 5/1999 | Reber et al. | |
| 5,903,729 A | 5/1999 | Reber et al. | |
| 5,974,447 A | 10/1999 | Cannon et al. | |

(Continued)

FOREIGN PATENT DOCUMENTS

JP    06335971 A    * 12/1994

OTHER PUBLICATIONS

Parameswaran Ramanathan;Delivery of Time-Critical Messages Using a Multiple Copy Approach; 1992;ACM; 10; 145-166.*

(Continued)

*Primary Examiner* — Evans Desrosiers
(74) *Attorney, Agent, or Firm* — Orrick, Herrington & Sutcliffe LLP

(57) ABSTRACT

Methods for formatting email messages into stylized templates for delivery to a printer. The templates include a variety of different formats to accommodate the various elements of the email message. The available templates can include themed templates, calendars, to-do lists, address books, stationary, and the like. The system and methods format the email message by parsing the elements of the message into component parts and fitting them within a template.

75 Claims, 4 Drawing Sheets

(56) References Cited

U.S. PATENT DOCUMENTS

| | | | |
|---|---|---|---|
| 6,141,341 | A | 10/2000 | Jones et al. |
| 6,366,698 | B1 | 4/2002 | Yamakita |
| 6,404,764 | B1 | 6/2002 | Jones et al. |
| 6,442,573 | B1 | 8/2002 | Schiller et al. |
| 6,522,790 | B1 | 2/2003 | Zhang et al. |
| 6,594,503 | B1 | 7/2003 | Herzig et al. |
| 6,742,161 | B1 | 5/2004 | James et al. |
| 6,865,594 | B1 | 3/2005 | Belissent |
| 2001/0050781 | A1* | 12/2001 | Kujirai ................... 358/1.15 |
| 2002/0174185 | A1* | 11/2002 | Rawat et al. ............. 709/206 |
| 2002/0194246 | A1* | 12/2002 | Moskowitz et al. ....... 709/102 |
| 2003/0233411 | A1 | 12/2003 | Parry et al. |
| 2004/0024811 | A1 | 2/2004 | Kitada et al. |
| 2004/0066435 | A1 | 4/2004 | Lester et al. |
| 2005/0022104 | A1* | 1/2005 | Wrenholt et al. ......... 715/500 |
| 2005/0027781 | A1* | 2/2005 | Curry et al. ............. 709/200 |
| 2005/0091599 | A1* | 4/2005 | Yamakado et al. ........ 715/732 |
| 2005/0114759 | A1 | 5/2005 | Williams et al. |
| 2005/0144244 | A1 | 6/2005 | Landesman |
| 2006/0098650 | A1* | 5/2006 | Beninato et al. ......... 370/389 |
| 2006/0242247 | A1* | 10/2006 | Richardson ............. 709/206 |
| 2006/0279796 | A1 | 12/2006 | Wishneusky et al. |
| 2007/0043818 | A1* | 2/2007 | Cottrille et al. .......... 709/206 |

OTHER PUBLICATIONS

Ceiva, "*Sharing Made Easy*", Digital Photo Receiver, 2005: pp. 1-31. http:www.ceiva.com/lmore/dpr/dprjsp; jsessionid=aYf7dfflCe_c.

MSN TV: Experience, MSn TV-Microsoft Internet Explorer. 2 pages. http://www.webtv.com/pc/experience/.

EarthLink, Mail Station 250 Product Information FAQ. 4 pages. http://support.earthlink.net/mu/1/psc/img/walkthroughs/other/Cidco_Mailstation; 2005.

Rowe, J.W. et al., "*Successful Aging.*" The MacArthur Foundation Study. Ch. 10, 1998.

Faber, A.D. et al., "*Social Support and Social Networks: Synthesis and Review*", pp. 29-72 2002.

Glass, Thomas A., "*Population Based Study of Social and Productive Activities as Predictors of Survival Among Elderly Americans—Statistical Data Included*". htttp://findarticles.com/p/articles/mi m0999/is 7208 319/ai 55721107/print; 2004, pp. 1-13.

Veghese, J. et al., "*Leisure Activities and the Risk of Dimentia in the Elderly*." The New England Journal of Medicine, pp. 2508-2516. 2003; www.nejm.org.

McGrath, Ellen, "*Action Strategies: Family Depression.*" Psychology Today, 2002. https:/cms.psychologytoday.com/articles/2002.html. pp. 1-3.

Hall, M. et al., "*The Effects of Social Isolation and Loneliness on the Health of Older Women.*" Department of Community Health Sciences, 1999. pp. 1-4.

Family Caregiver Alliance © . "*Caregiving and Depression*" http:///www.caregiver.org/caregiver/jsp/content_node.jsp?nodeid=393; pp. 1-8.

Beneditctis, T. et al., "*Caring for a Person with Alzheimer's Disease or Another Dementia.*" http:///www.helpguide.org/elder/alzheimers_disease_dementias; 2001-2007; pp. 1-7.

*Stress.* Sep. 2001, pp. 1-23; http://www.reutershealth.com/wellconnected/doc31.html.

Yapko, Michael D., "*The Art of Avoiding Depression—Cover Story.*" Psychology Today., 1997, pp. 1-3.

"*Mental Health: A Report of the Surgeon Central*". Chapter 5, pp. 1-21. http://surgeongeneral.cov/library/mentalhealth/chapter5/sec. 3.html.

"*Depression Research at the National Institute of Mental Health.*" NIHM National Institute of Mental Health. http://www.nimh.nih.gov/publicat/depresfact.cfm, pp. 1-23.

\* cited by examiner

METHOD AND SYSTEM FOR FORMATTING MESSAGES INTO STYLIZED MESSAGES FOR PRINT OUT

This application claims the benefit of U.S. provisional application 60/747919 filed May 22, 2006 under 35 USC §119(e), the entire contents of which are incorporated herein by reference.

FIELD

The disclosure relates to methods and systems for formatting and configuring email messages into a format that can be readily printed out or displayed, and more specifically to methods and systems for formatting such messages into desired templates for delivery to a printer or display unit.

BACKGROUND

Older adults have become the fastest-growing segment of the United States population, and their numbers are expected to double from 35 million to 70 million between 2000 and 2030. Currently, nearly eighty percent of adults over the age of sixty do not use the Internet and are therefore disconnected from digital communications such as email, instant messaging, web browsing and short messaging service ("SMS") that their younger family members and friends take for granted.

At the same time, digital photography is replacing traditional photography, and the number of digital cameras sold in the United States is expected to grow to 24 million in 2008. Current systems exist for the transmission of photographs to users without a computer or to users who are unable to sufficiently operate a computer. However, these systems are not able to receive email messages that are formatted into selected templates. Therefore, a need exists for methods and systems for formatting messages such as emails into stylized messages that can be printed out.

SUMMARY

The present methods and systems allow non-computer users, such as seniors, to receive emails via a printer wherein the emails are formatted and configured by a central service into printer-friendly formats for delivery to the printer. The methods and systems also allow for the viewing of the emails on a display unit such as a monitor. The methods and systems further comprise formatting elements of the email message into preselected templates. The configuration of the templates can be modified by the sender based on the elements of the email such as text, photos, title, etc. The template used can be selected by the sender, based on default preferences, and/or be selected by the service based on the number and types of elements in the email message. In a further embodiment, the system can configure the printer-friendly version based on a set of parameters and, if needed, select an alternative template that best fits the elements of the email.

Other systems, methods, features and advantages of the various embodiments disclosed herein will be or will become apparent to one with skill in the art upon examination of the following figures and description.

BRIEF DESCRIPTION OF THE DRAWINGS

Preferred embodiments are illustrated by way of example, and not by way of limitation, in the figures of the accompanying drawings, in which like reference numerals refer to like components.

DESCRIPTION OF THE PREFERRED EMBODIMENTS

In the following description, the primary user of the system is referred to as a "senior." The person who monitors the senior's account and assists in configuring the system is referred to as the "caregiver." Although this discussion reflects an exemplary situation in which an adult-child caregiver assists her senior parent in using the system, the system is in no way limited to this type of relationship.

Figure 1:
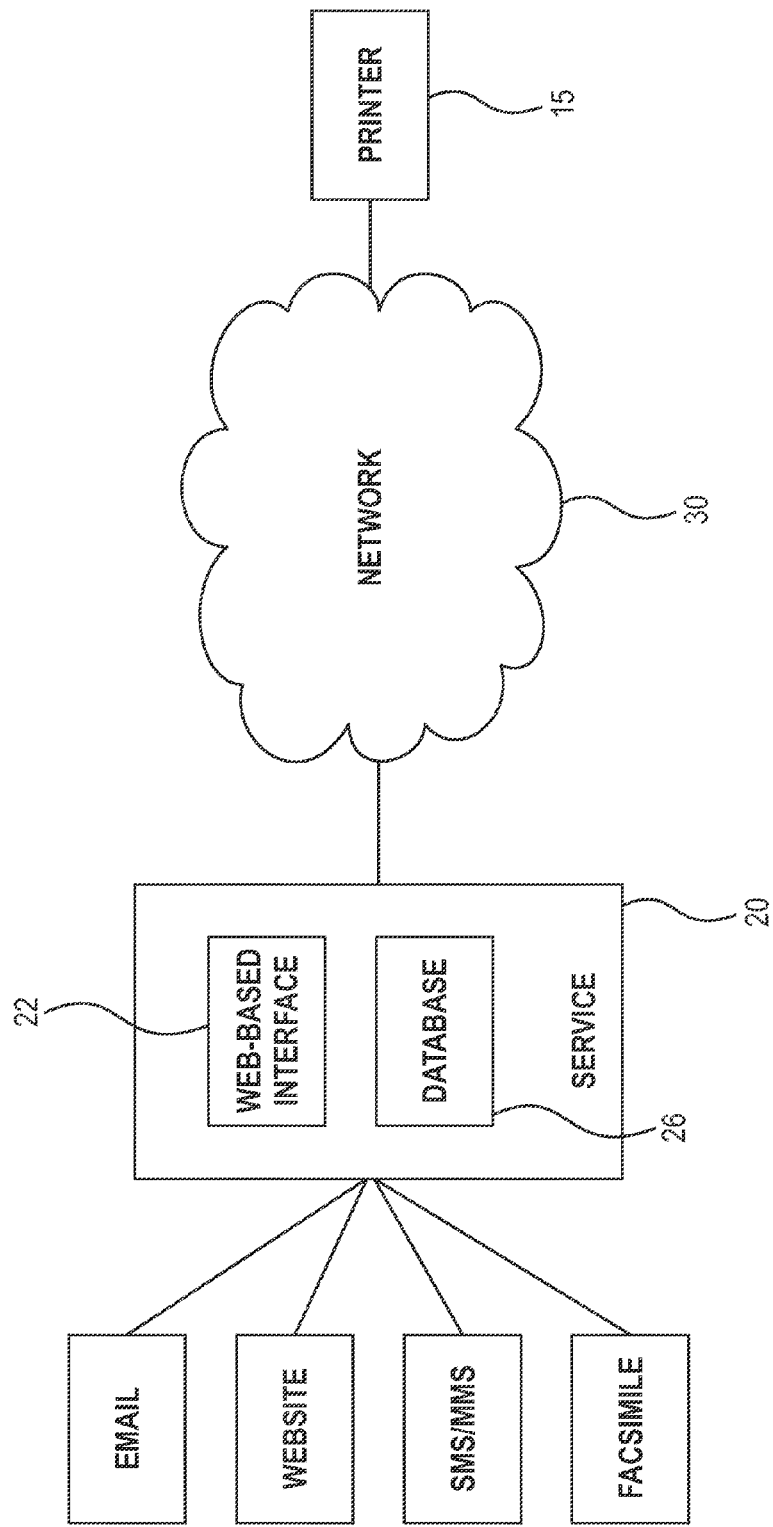
FIG. 1 is a schematic of a system according to an embodiment of the invention.

FIG. 1 shows a system according to an embodiment of the invention. The system includes a printer 15, a central service 20, and a network 30 that connects the printer 15 to the service 20. The printer 15 may be an ink-jet printer, a dye-sublimation printer, a laser printer, or the like. The housing of the printer 15 preferably includes a data modem network interface ("NIC") or other means of communicating with the network 30. The printer 15 also preferably includes computing resources to buffer, decompress, render, and print content, and custom software or firmware to control the printer 15. The printer 15 is connected to the service 20 via the network 30 such as the Internet, DSL, a phone line, wireless WAN, or other means known in the art. In a further embodiment, the system can include a display unit such as a monitor on which the formatted messages are displayed.

In the preferred embodiment, the service 20 includes a web-based interface 22 that allows a user of the system such as the caregiver or senior to configure settings for the senior's account. The system also allows users to send messages and other information to the senior's printer 15. The messages are first transmitted by the user to the service 20, and then the service 20 formats the messages for delivery to the senior's printer 15. As described further below, incoming messages are formatted into stylized messages using templates, and the stylized messages are printed out at the senior's printer 15. In the preferred embodiment messages are sent to the service 20 via email, but other methods of transmission known in the art can also be used such as, but not limited to, SMS/MMS, facsimile, or via a website. In the preferred embodiment, the senior's printer 15 is designated with an email address to enable the service 20 to recognize email messages intended for the senior.

Figure 2:
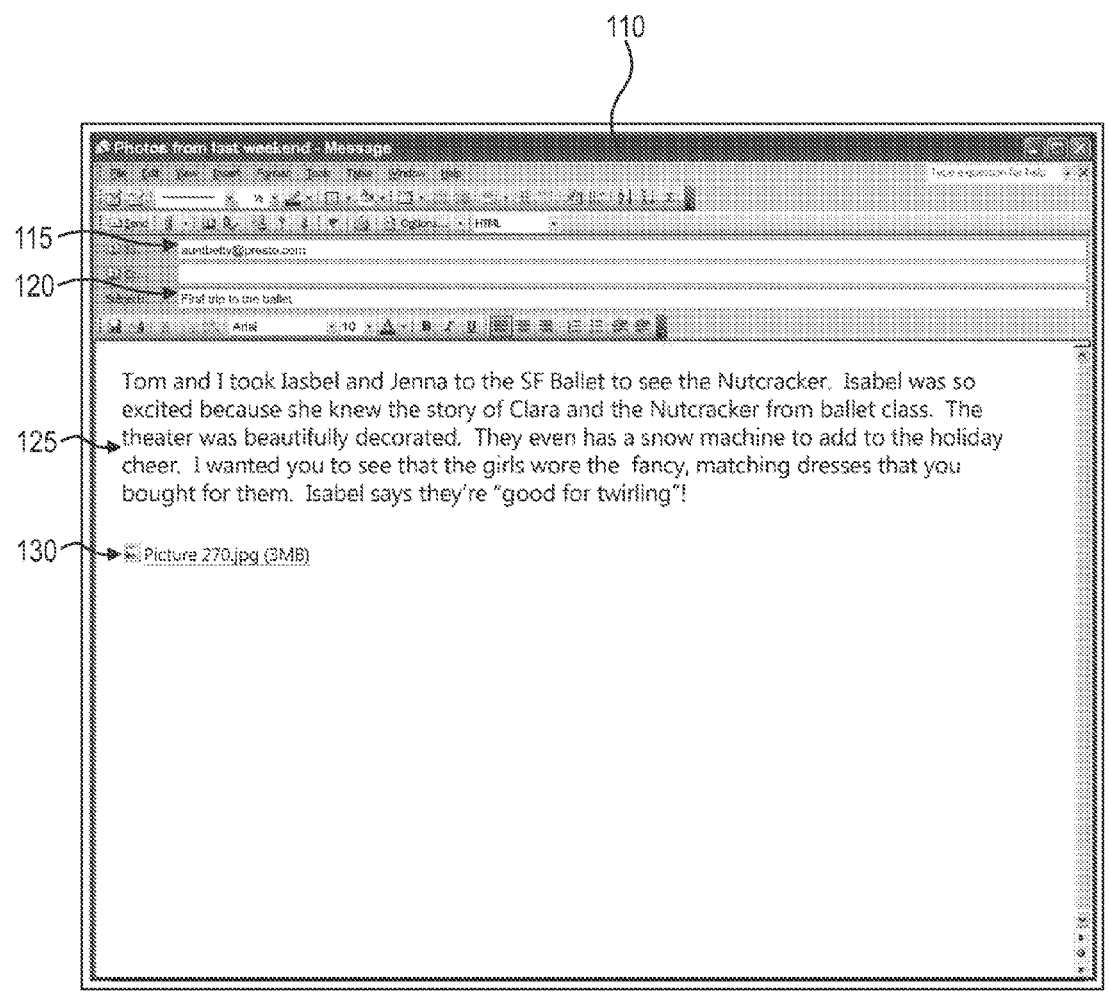
FIG. 2 shows an example of an email message in an email application.
Figure 3:
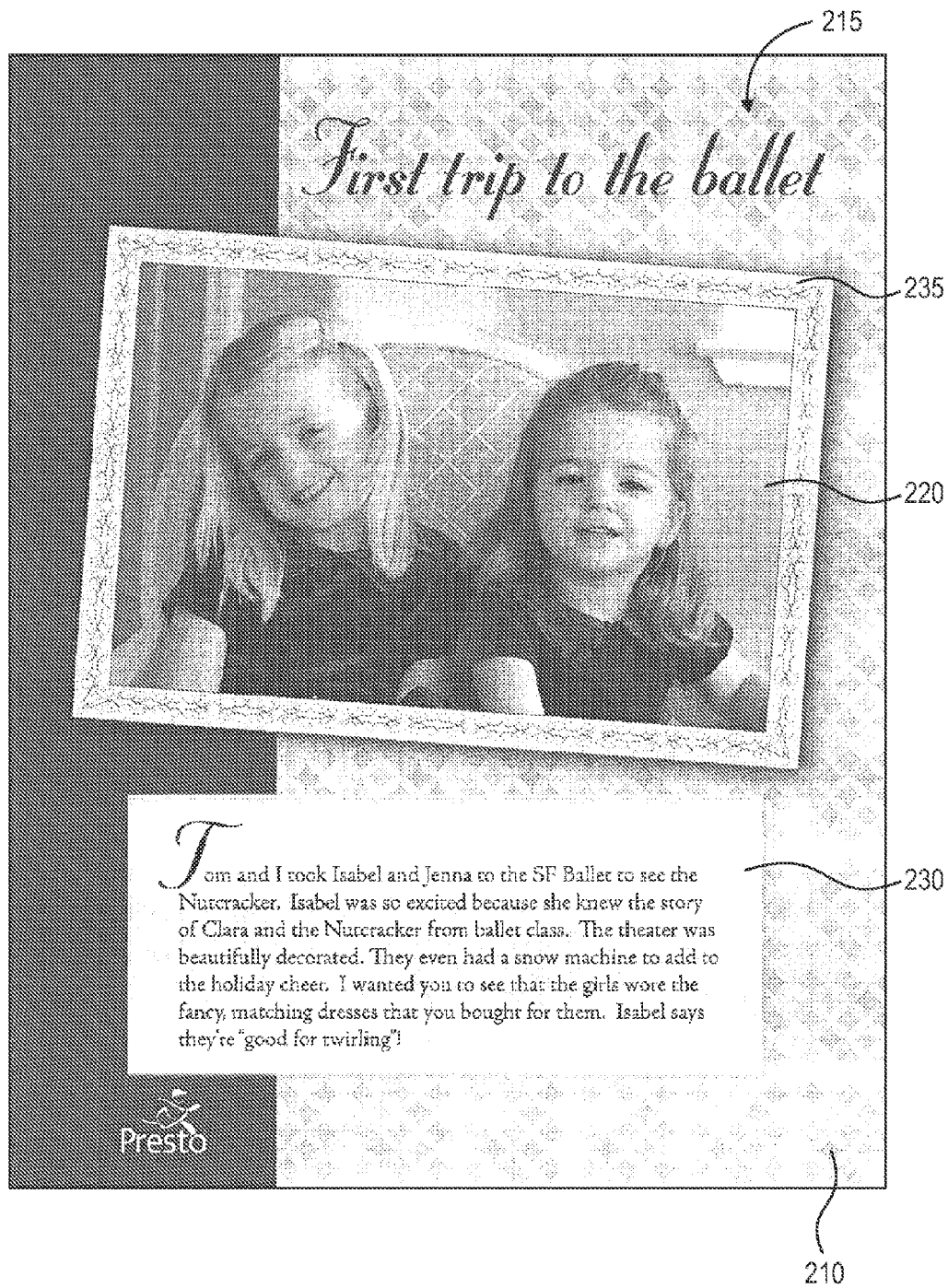
FIG. 3 shows an example of a stylized message based on the email message in FIG. 2 according to an embodiment of the invention.

FIGS. 2 and 3 illustrate a method for formatting an email message into a stylized message and printing the stylized message at the senior's printer 15 according to an embodiment of the invention. FIG. 2 shows an email message 110 in an email application to be sent to the senior, e.g., Betty. In this example, the email message is addressed to "auntbetty@presto.com" 115 which is an address designating Betty's printer 15. Email messages sent to this address are received by the service 20, which in this example is named "Presto." The service 20 uses the username in the address, e.g., "auntbetty," to route the message to Betty's printer 15 after stylizing the message. The email also includes the subject "First trip to the ballet" 120 in the subject header, a message 125 for Betty in the text body, and a photo attachment 130.

FIG. 3 shows an exemplary stylized message in which elements of the original email message have been placed into a stylized template by the service 20. The stylized template includes a background 210, a title space 215, a photo space or area 220, and a text space or text body area 230. The subject header 120 of the original email is placed into the title space 215 of the stylized template. The font style and font size of the title may be dictated by the template. The photo attached 130 to the original email is placed into the photo space 220. In this example, the photo space 220 includes a stylized frame 235 for framing the photo. Further, the photo space 235 is orientated at a slight angle for tilting the photo. The text in the text body 125 of the original email is placed into the text space 230 of the stylized template. The font style and font size of the text may be specified in Betty's account by Betty's caregiver or Betty. For example, Betty's caregiver may specify a large font size for the text so that Betty can more easily read the text. Information regarding the preferences of the senior and the caregiver, and other account specific information can be stored on a database 26. Other preferences such as, but not limited to, the template preference of a particular sender, customized templates, and manner in which the sender's information is displayed on the formatted message can also be stored on the database 26.

After the original email message has been formatted into the stylized message by the service 20, the service 20 transmits the stylized message to Betty's printer 15, which prints out the stylized message.

In the preferred embodiment, the service 20 provides a variety of template styles from which to choose. For example, the service 20 can provide a variety of themed templates for different occasions. To select a particular template style, the service 20 enables the caregiver or senior to access the service 20 via the Web, and select a template style from a catalog. The service may also enable the caregiver or senior to customize a template by providing a variety of different backgrounds, photo frames, and/or font styles to choose from for the custom template. The service may also enable the caregiver or senior to upload an image or photo to use as a background for the custom template. In an embodiment, the template style selected by the caregiver or senior is used as a default template style for incoming email messages.

The service 20 may also enable the sender of an email message to specify a template style other than the default template to be applied to the email. For example, the sender may specify the template style by including a name of the template style enclosed in brackets in the subject header of the email or by picking it from a visualized selection user interface, provided by a mail client plug-in which translates the selection into the designated template style name. In the example shown in FIG. 2, the sender of the email message may write the subject header as "First trip to the ballet [Presto Event]," in which "Event" is the name of the template style selected by the sender. In this example, "First trip to ballet" would appear in the title space of the stylized message and "[Presto Event]" would be used by the service 20 to identify the template style to be applied to the email message.

As stated above, a variety of templates are available. By way of non-limiting example, the service 20 can provide a beach themed template, a holiday themed template, a masculine template, a feminine template, and the like. Other templates could be to convey a mood or sentiment such as, but not limited to, "thinking of you", "get well", "love", "friendship", "celebration" and the like. In a further embodiment, the templates could vary based on the season and/or the sender's default template would be updated based on the change in season or month. For example, the sender could select a seasonal template to be used as the default template. For the winter months, the template could include, for example, a snow scene as a background. In the summer months, the template could display, for example, a beach scene. The seasonal template would therefore automatically adjust the template to match the date of the sender's email, and allow the sender to send such emails without having to select the appropriate seasonal template. As discussed herein, the content of the email message can dictate the template selected based on an evaluation of the elements of the email. In addition, the template selected can also be dependent on the subject line of the email message. In a further embodiment, the sender's email address can be used to select a template based on a sender's desired template information which is stored on the database of the service. The service can also select a template from within a template family randomly or based on certain criteria. For example, the printer may communicate information to the service regarding the levels of color ink, and the system could select a template to reduce utilization of a color that is low. Other criteria such as, but not limited to, the total ink levels, printer capabilities relating to colors, type of ink (regular/photo), and type of paper (regular/photo) available can also be used to select a template.

Other templates can be used such as to-do lists, address books, diaries, notepads, etc. Stationary that can be used by the senior with a particular theme or background could also be sent to the senior by either including an email with no content or attachments, or by including, for example, "[Presto HolidayStationary]" in the email subject line. In the latter method, the sender could include text within the transmission email and the senior would receive the formatted message and then one or more pages of the holiday-themed stationary.

Figure 4:
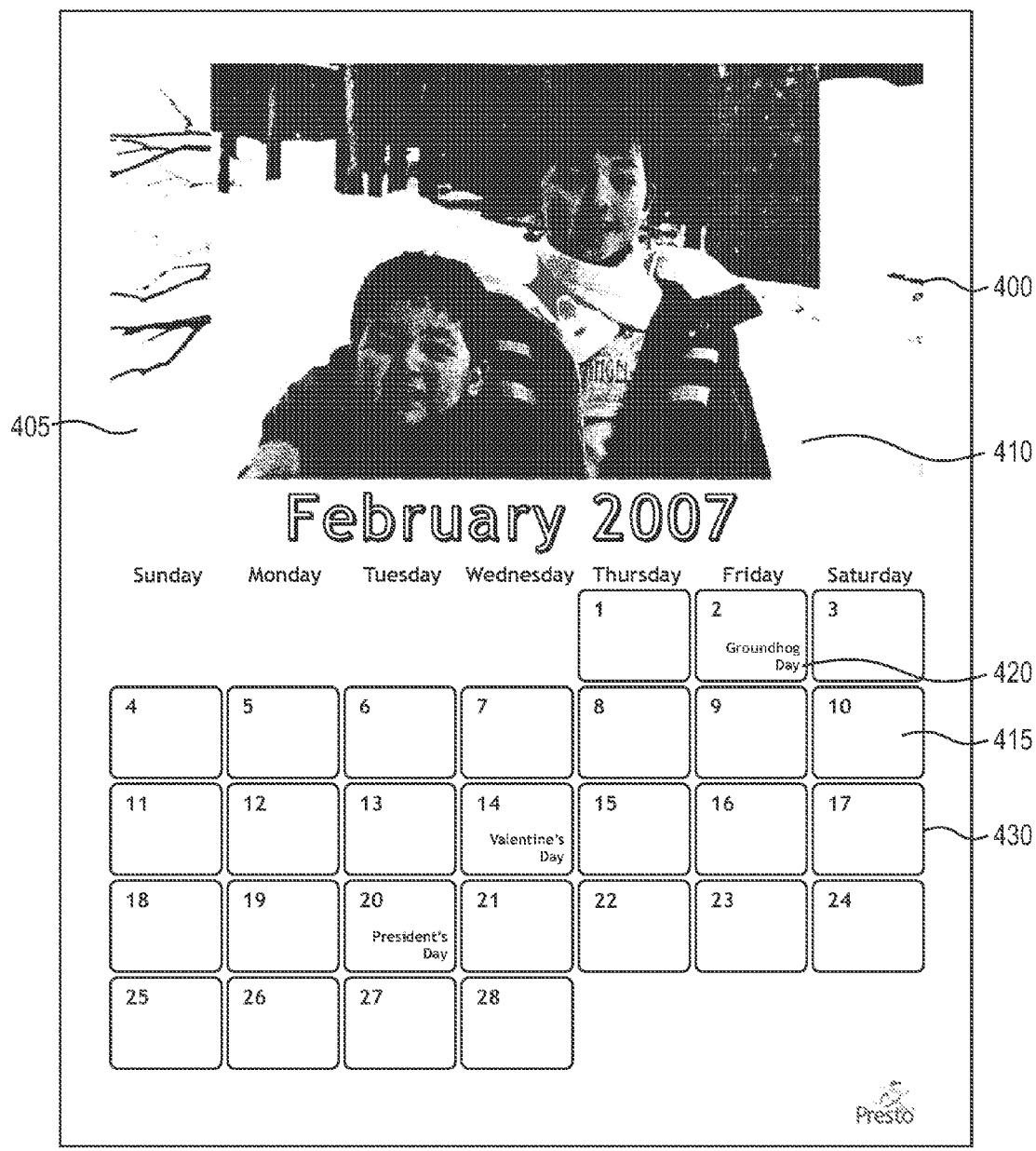
FIG. 4 shows an example of a calendar template of the invention.

Another exemplary form of template is a calendar. As shown in the exemplary calendar template of FIG. 4, calendar templates can include a background 405 that coincides with the season of the selected month and/or a holiday within the month. Other calendar backgrounds 405 can also be selected. For example, if it is the senior's birthday within the month, the sender could send a monthly calendar with a birthday-themed background. The sender can also include a photograph 410 to be displayed in the top portion 400 of the calendar. If the email requesting a calendar template does not include an attached photograph, a default picture could be used. In a preferred embodiment, the generic default picture is correlated to the month of the calendar. For example, a December calendar could use a default picture of a snow scene and a May calendar could include a default picture of a flower. Alternatively, the calendar could include just the background graphics if a photograph is not attached, if desired. The bottom portion 430 of the calendar page includes a calendar grid 415 of the days of the month. In a preferred embodiment, each page of the calendar template comprises a calendar grid 415 for a single month, but other configurations are also possible such as one week, two weeks, two months, and the like. The calendar grid 415 can also include text or images 420 indicating, for example, holidays within the month. In a further embodiment, the service 20 could import information within the senior's account to the calendar grid 415. For example, the service 20 could store data within the senior's account regarding birthdays within the family, other special events, and/or appointments. If such events fall within the month of the calendar, these events could be incorporated into the calendar grid 415 on the appropriate date. The calendar template, like other templates, could be designated in the subject line of the email. To select a calendar for May 2007, for example, the sender could enter "[Presto Seasonal-May07]" and the selected calendar template would be employed by the system.

Calendars for multiple months can also be generated. As with the single month calendars, attached photos or system default photographs can be placed onto the background of the calendar template as desired. If a multiple month calendar is requested and multiple photographs are attached, the photographs can be added sequentially to the calendar templates. For example, if three months of calendar templates are desired, the sender could include "[Presto CalendarMayto-July"] in the subject line of the email. Within the email, the sender could attach three photographs. The system would then place the first photograph in the background for the May calendar, the second photograph in the June calendar, and the final photograph in the July calendar. If the number of photographs attached to the email does not equal the number of requested months, default photographs can be used for the remaining months. Using the example above, if only two photographs are attached to the email requesting a calendar from May to July, the photographs could be used for May and June, and a default photograph used for July.

In the preferred embodiment, each template style includes a set of related templates (a "template family") designed to accommodate email messages having different numbers, sizes and orientations of elements. For example, templates in a template family can have the same background, but different photo spaces to accommodate different photo sizes (e.g., 5"×7", 4"×6", 3.5"×5", 2"×3" inches), and different numbers of photos (e.g., one 4"×6" photo, two 2"×3", or other combinations of sizes). For example, if two 2"×3" photos are attached to an email message, the service 20 can automatically select a template in the template family having two photo spaces for 2"×3" photos. Templates in a template family can also accommodate different combinations of photo sizes (e.g., one 4"×6" photos and one 2"×3" photo). In the preferred embodiment, the service 20 identifies the size(s) of photos attached to an email by reading the metadata in their files, and automatically selects the appropriate template in the template family based on the number and sizes of the attached photos. In a further embodiment, the service 20 can select a template to maximize the number of photographs that fit onto a page and/or to maximize the size of the photographs displayed. For example, if only a single photograph is attached and there is sufficient space on the page to display the photograph as an 8"×10" photograph, then the service 20 could select a template that allows for such photo size.

Templates in a template family can also have different photo spaces to accommodate different orientations of photos (portrait versus landscape). Further, the attached photos can be laid out in their original orientation or placed at angles. For example, in the template shown in FIG. 3, the attached photo is orientated at a slight angle from its original orientation. The photos can also overlap each other. For example, a template can have photo spaces that slightly overlap each other so that photos placed into the photo spaces form a collage. Template families may include both portrait and landscape page orientations.

Templates in a template family can also include frames for framing photos placed into the photo spaces. Preferably, the frame(s) in each template are sized to fit around the photo spaces in the template. Each frame can be sized to fit exactly around the corresponding photo space or can be sized to be slightly larger than the photo space to provide space for a mat or border around the photo.

Elements of an email can be placed into spaces in the template in the order they appear in the original message and/or the order of attachment to the source email message. The elements can also be reordered to save paper in a paper saving mode. For example, the caregiver can specify the paper saving mode in the senior's account to reorder the sequence of photos to save paper. When this is done, the service 20 determines the order of photos of an email that requires the least amount of paper to print. For example, if the original email includes several photos of varying sizes, then the service 20 selects a template that can accommodate all the photos using the least amount of paper regardless of the order in which the photos are attached.

Each template in the template family preferably includes a front or first page and overflow pages to accommodate overflow of elements. For example, the template can have an overflow page to accommodate overflow of text (i.e., text that overflows from the text space of the front page), overflow of photos or a combination thereof. The front page can have a highly stylized design and the overflow pages can have designs with simpler layouts to accommodate a wide range and volume of overflow. Preferably, the front page and the overflow pages have related elements (e.g., similar backgrounds) to maintain a consistent look.

One of the challenging problems is figuring out how to handle elements (e.g., text photos, titles, etc.) that do not fit into the space allocated to them. One or both of the following two methods can be used.

In the first method, for each template, there may be a set of related, similar template designs to accommodate limited amounts of overflow (e.g., different amounts of text). For example, the front page of a template may be considered the best-looking design and the set of related, similar designs may be considered less attractive alternative designs that provide slightly more room for variable elements by squeezing the space allocated for fixed elements. For example, the front page of the template shown in FIG. 3 may be considered the best-looking design with a set of related, similar template designs that provide more space for text in the front page by enlarging the text space by squeezing the space between the text space and the photo space and/or reducing the size of the bottom margin. In this embodiment, if an element (e.g., text) of an email does not fit into the front page of the best-looking design, then the service 20 will test the element for fit into the set of related, similar template designs. The service 20 can try the related, similar designs in order of preference. For example, if the text of an email does not fit into the text space of the best-looking design, then the service 20 can apply the related, similar designs in order of increasing text space.

For example, a template may have the following design options for the first page:
4"×1" title area, one 4"×6" portrait photo, 5"×3" text body area
    Same with 5"×1" title area
    Same with 5"×1.5" title area
    Same with 5"×3.5" text body area
    Same with 5"×4" text body area
    Fallback version where the first design represents the best-looking first page design and the other first page designs are from the set of related, similar designs to accommodate limited amounts of overflow. Large amounts of overflow go to overflow pages. The fallback version is discussed below.

Other examples includes:
4"×1" title area, one 4"×6" landscape photo, 5"×3" text body area
    Similar alternatives to accommodate limited overflow as above 4"×1" title area, one 4"×6" landscape photo, one 2"×3" landscape photo, 5"×3" text body area
  Same with 5"×1" title area
  Same w/ 5"×1.5" title area
  Same w/ 5.5"×3" text body area
  Same w/ 5.5"×3.5" text body area
  Fallback version
4"×1" title area, three 2"×3" portrait photos, 5"×3" text body area
  Same with 5"×1" title area
  Same w/ 5"×1.5" title area
  Same w/ 5.5"×3" text body area
  Same w/ 5.5"×3.5" text body area
  Fallback version Overflow pages can be subjected to a similar priority mapping that is used to select the first page. Specifically, an overflow page template can be selected from a prioritized list of such templates, wherein the highest priority template that fits the remaining unrendered content of the message is selected. This process continues iteratively until all the content has been rendered. Text overflow and photo overflow may be printed on separate overflow pages. In the case of photo overflow, the photos may be laid out as best as possible, but without the concept of target photo areas (on the overflow pages only).

The other method is to adjust the dimensions of the allocated space for an element within constrained boundaries. In this embodiment, for an element that exceeds the allocated space in the template, the service 20 calculates the amount of space required to fit the element and adjusts the dimensions of the allocated space accordingly if the calculated space does not exceed the boundary constraint. For example, a template may have a text space having dimensions of 2.5"×4" with a boundary constraint of 2.5"×7" inches. In this example, if the text of an email exceeds the dimensions of the text space, then the service 20 calculates dimensions capable of fitting the text. If the calculated dimensions are between 2.5"×4" and 2.5"×7" inches, then the dimensions of the text space are adjusted accordingly.

In another example, the service 20 can dynamically adjust the dimensions of a photo space within boundary constraints to fit a photo. For example, if the photo space has dimensions of 4"×6" inches and an attached photo has dimensions of 4"×5" inches, then the dimensions of the photo space can be adjusted to 4"×5" inches by shortening the width of the photo space. The dynamic adjustment of photo spaces enables the photo spaces to fit, e.g., photos having nonstandard photo sizes and/or nonstandard aspect ratios. If the photo space includes a frame, then the frame can also be adjusted accordingly.

In yet another example, the service can dynamically remove visual elements from a template to make room for another element to fit on a page. For example, the service 20 can remove the "Presto" logo from the page shown in FIG. 3 to make room for more text on the page. In another example, the background may include a sea shell in a corner for a beach themed template. In this example, the service 20 can dynamically remove the sea shell from the page if more space is needed to fit an element (e.g., text or photo) of the email. Further, if an email does not include an element for an allocated space, then the allocated space can be removed. For example, if the sender leaves the subject header of an email blank, then the service 20 can remove the title space.

If an element cannot fit into the allowed space using the above methods, then the service 20 can use an overflow page to accommodate the element.

Instead of using an overflow page to accommodate an element that cannot fit into the allocated space for the element, the service can use a "fallback" template that has design elements related to the requested template. For example, the "fallback" template can have a similar background to the first page of the requested template, but have considerably more flexibility to accommodate a wider variety of element sizes and types. For example, in a situation where it is important to retain the entire text of an email on a single page of the stylized message, the service 20 can use a "fallback" template to fit the entire text on the first page of the stylized message. The "fallback" template may accommodate the entire text, e.g., by placing an attached photo on another page. In an embodiment, the service 20 analyzes the text in the text body of an email to determine whether to retain the entire text on the first page of the stylized message. For example, the service 20 may determine to retain the entire text on a single page if the text includes stylized fonts, different font colors, bolded and/or underlined fonts, and/or small images (e.g., smiley faces from Microsoft Outlook) inserted into the text. The service 20 may also determine to retain the entire text on a single page if the text contains HTML code. If the service 20 determines to retain the entire text on a single page, then the service 20 will use a "fallback" template if the text does not fit into the text space of the requested template. This is based on the assumption that a sender who intentionally stylizes elements (e.g., text) of the email wants the stylized elements to remain in their original form or location relative to the other elements. In contrast, the service 20 determines that text does not need to be retained in its entirety on a single page if the text is plain text. In this case, the service will not use a "fallback" template and instead use an overflow page to accommodate text that cannot fit in the allowed space of the first page. Some of the text will be printed on the first page and the remainder on an overflow page. Most preferably, text elements are broken at line boundaries such that the text and images are not split across the page and the text is not repeated on multiple pages.

Overflow pages follow a stylized first page (either the most desirable one, one in which elements have been cramped to make room for limited overflow, or a fallback version).

In an embodiment, a photo that is too large to fit into the photo space allocated to it is resized to fit into the photo space. The frame can be of fixed size and the photo resized to fit as best as possible with a mat filling any unused space. For example, if the aspect ratio of the photo is different than the frame's aspect ratio, then the mat would fill the unused space in one direction (horizontal or vertical) but not both. A photo that is too small for a photo space is not resized. Instead, the photo is placed into the photo space with a mat to fill in the space between the photo and the frame. In a further embodiment, the photograph can be cropped to fit the aspect ratio of the photo space in the template. Cropping can be based upon heuristic analysis of image contents.

If the original email message includes an attachment that is also an email, then the service applies the same template family to them separately, but relates the two printed stylized message by having one and/or both of the printed messages refer to the other. For example, an email may contain photo attachments and an attached email. In this example, the service 20 would apply the template to the first email including the attached photos, but not the attached email. Instead, the service would apply the template separately to the attached email. The front page of the printed message for the attached email may include a note that the second message was from an email attached to the original email. If the first email included more than one attached email, then the service can apply the template to each attached email separately. If an attached email itself includes an attached or embedded email, then the service 20 applies the template to the subsequent embedded email separately.

The printed message can also include the email address of the sender (from the "From" field of the email), the phone number of the sender (if available), name of sender (if available), and/or date sent (from the "Date" field of the email). The service 20 may identify the name and/or phone number of the sender from an address book that links the sender's email address with information about the sender. Other information can also be printed onto the page such as the senior's name and/or email address.

Often, mailers (such as Microsoft Outlook) turn character sequences into graphics (e.g., Outlook turns ":-)" into a smiley face). When the service 20 detects a character sequence, the service can do a similar conversion if the mailer has not already done this, so that the converted image is printed out.

In a preferred embodiment, the sender is able to view the formatted message prior to delivery to the senior. The sender could receive, for example, a return email that displays the formatted message. This return email could include a pdf file version of the formatted message or any other file type that displays the formatted message. In a further embodiment, the service 20 could display a preview of the stylized email prior to sending the email. For example, the sender could fill in selected fields on a user web-based interface 22 for the service and then submit the completed form. The user interface could then display the formatted message with the sender's elements. The sender could then choose to either send the message as displayed, or modify the message as desired.

In this application the term "photo" also includes images other than actual photographs in any image file (e.g., jpeg, tiff, gif, etc.).

What is claimed is:

1. A method of delivering a message comprising:
   receiving an email message directed to a preselected recipient at a central service, wherein the recipient is specified by an email address associated with the recipient, and wherein the email message comprises one or more elements;
   resolving the elements of the email message into one or more categories of elements;
   formatting the email message into a printer-friendly format for delivery of the message to the recipient's printer by placing the elements of the email message into a selected template, wherein the template comprises a plurality of spaces configured to receive a preselected category of elements and the template is selected based on the elements of the email message;
   transmitting the formatted message to the recipient's printer over a network, wherein the recipient's printer comprises a printing device owned or possessed by the recipient; and
   sending instructions to print the formatted message at the recipient's printer for direct receipt by the recipient.

2. The method of claim 1, wherein the elements of the email include a subject and a text body, the template includes a title space and a text space, and the formatting step comprises:
   placing the subject of the email into the title space of the template; and
   placing the text body of the email into the text space of the template.

3. The method of claim 2, wherein the elements include a photo attached to the email message, the template includes a photo space, and the formatting step comprises:
   placing the photo attached to the email message into the photo space of the template.

4. The method of claim 3, wherein the photo space of the template is orientated at a different angle than the photo attached to the email message.

5. The method of claim 3, wherein the photo space of the template overlaps another photo space.

6. The method of claim 1, wherein the formatting step comprises:
   selecting the template from a template family comprising a set of related templates.

7. The method of claim 6, wherein the related templates in the template family are designed to accommodate different sizes of photos, and the selecting step comprises:
   selecting the template from the template family based on the size of the photo attached to the email message.

8. The method of claim 7, wherein the template is selected to maximize the size of the photo.

9. The method of claim 6, wherein the related templates in the template family are designed to accommodate different numbers of photos, and the selecting step comprises:
   selecting the template from the template family based on a number of photos attached to the email message.

10. The method of claim 9, wherein the template is selected to maximize the number of photos shown on a page.

11. The method of claim 6, wherein the template is selected based on the orientation of the photos.

12. The method of claim 6, wherein the related templates in the template family have a common theme.

13. The method of claim 1, wherein each of the plurality of spaces have predefined initial dimensions, and the formatting step comprising:
   if the element fits within the initial dimensions of the space of the template, placing the element into the space; and
   if the element does not fit within the initial dimensions of the space, increasing the dimensions of the space to accommodate the element.

14. The method of claim 13, wherein the dimensions of the space can be increased within a boundary constraint, and the formatting step comprises:
   if the element does not fit within the initial dimensions of the space, calculating dimensions required to fit the element; and
   if the calculated dimensions are within the boundary constraint, increasing the dimensions of the space according to the calculated dimensions.

15. The method of claim 14, wherein the element is text in the text body of the email message, and the space is a text space of the template.

16. The method of claim 14, wherein the element is a photo attached to the email message, and the space is a photo space of the template.

17. The method of claim 14, wherein the element is a subject of the email message, and the space is a title space of the template.

18. The method of claim 6 wherein the templates in the template family have spaces of different dimensions for an element of the email message.

19. The method of claim 18, wherein the related templates include a preferred template, and the selecting step comprises:
   if the element fits into the space of the preferred template from the set of related templates, selecting the preferred template; and
   if the element does not fit into the space of the preferred template, selecting a template from the set of related templates having a space large enough to fit the element.

20. The method of claim 18, wherein the related templates have a common look.

21. The method of claim 18, wherein the related templates are a prioritized list of templates, and the selecting step comprises:
selecting the template with the highest priority that fits the elements of the email.

22. The method of claim 2, further comprising:
selecting the template from a set comprising a preferred template and a fallback template, wherein the fallback template has greater flexibly in accommodating an element of the email message than the preferred template.

23. The method of 22, wherein the selecting step comprises:
determining whether the element of the email message needs to be retained on a single page of the formatted message; and
if the element needs to be retained on a single page of the formatted message and it cannot fit on the preferred template, selecting the fallback template.

24. The method of claim 23, wherein the element is text in the text body of the email message, and the step of determining whether the element needs to be retained on a single page comprises:
if the text in the text body of the email message includes stylized fonts, different color fonts or HTML code, determining that the text needs to be retained on a single page of the formatted message.

25. The method of claim 2, wherein if all of the elements do not fit onto a single page, placing the elements on one or more overflow pages.

26. The method of claim 25, wherein any text portion is broken between pages at line boundaries such that text characters are not split across pages.

27. The method of claim 25, wherein images are broken between pages such that the image is not broken into parts across page boundaries.

28. The method of claim 2, wherein the template comprises one or more visual elements, further comprising:
if the elements of the email cannot fit onto a page, removing visual elements to accommodate the elements of the email.

29. The method of claim 3, further comprising:
adjusting dimensions of the photo space based on the size or aspect ratio of the photo attached to the email message.

30. The method of claim 3, further comprising:
cropping the photographs such that the photograph fits within an available photo space of the template.

31. The method of claim 1, further comprising:
placing elements into the template in the order the elements appear in the email message or the order the elements are attached to the email message.

32. The method of claim 1, further comprising:
reordering the placement of the elements in the template to save paper.

33. The method of claim 1, wherein the email message includes a second email message attachment, and further comprising:
formatting the second email message separately from the first email message.

34. The method of claim 33, further comprising:
including a reference in the second formatted message to the first formatted message.

35. The method of claim 1, further comprising:
returning a formatted version of the email message to a sender of the email message.

36. The method of claim 35, wherein the step of returning occurs prior to the step of transmitting.

37. The method of claim 1, further comprising:
displaying to a sender of the email message a preview version of the formatted version of the email message prior to transmitting the formatted message.

38. The method of claim 1, wherein the template comprises a calendar.

39. The method of claim 38, wherein the calendar includes a calendar grid and a background.

40. The method of claim 39, further comprising:
attaching a photograph to the email message; and
placing the photograph over the background.

41. The method of claim 39, further comprising:
placing a default photograph over the background.

42. The method of claim 39, further comprising:
storing one or more event dates in association with a user's account; and
incorporating an event date in the appropriate calendar grid for the date if the event date falls within the request month.

43. The method of claim 1, wherein the template comprises a to-do list.

44. The method of claim 1, wherein the template comprises an address book.

45. The method of claim 1, wherein the template comprises stationary with a selected background.

46. The method of claim 1, wherein the template comprises a selection from a family of templates, wherein the selection of a particular template is dependent on the date of the email message.

47. The method of claim 46, wherein the template is a seasonal template.

48. The method of claim 46, wherein the template is a holiday template.

49. The method of claim 46, wherein the template is an event template.

50. The method of claim 49, wherein the event is a birthday.

51. The method of claim 49, wherein the event is an anniversary.

52. The method of claim 1, wherein the template is selected by the system from a family of templates.

53. The method of claim 52, wherein the template is selected at random from within the family of templates.

54. The method of claim 52, wherein the template is selected based on optimizing ink utilization.

55. The method of claim 52, wherein the template is selected based on a capability of the destination printer.

56. The method of claim 52, wherein the template is selected based on the amount of ink in the printer.

57. The method of claim 52, wherein the template is selected based on the type of ink in the printer.

58. The method of claim 52, wherein the template is selected based on the type of paper in the printer.

59. The method of claim 1, further comprising:
storing a set of user preferences at the central service; and
applying one or more user preferences to the formatted message.

60. The method of claim 59, wherein the user preference relates to the size of the font on the formatted message.

61. The method of claim 59, wherein the user preference relates to the font style of the formatted message.

62. The method of claim 59, wherein the user preference is specified by a person other than the user.

63. The method of claim 59, wherein the user preference relates to a default template family used for formatting incoming messages.

64. The method of claim 59, wherein the user preference relates to personal customization of a template.

65. The method of claim 59, wherein the user preference relates to the information displayed on the formatted message pertaining to the sender.

66. The method of claim 1, wherein the sender customizes the template.

67. The method of claim 2, wherein the sender specifies a particular template within the subject line of the email.

68. The method of claim 2, wherein the sender specifies a particular template by selecting the template on a user interface.

69. The method of claim 1, wherein the formatted message includes information regarding the sender.

70. The method of claim 69, wherein the information comprises the sender's name.

71. The method of claim 69, wherein the information comprises the sender's phone number.

72. The method of claim 69, wherein the information comprises the sender's email address.

73. The method of claim 1, wherein the template selected is dependent on the content of the email.

74. The method of claim 73, wherein the template selected is based on the subject of the email.

75. The method of claim 73, wherein the template selected is based on the sender's email address.

* * * * *